United States Patent
Feeser

(10) Patent No.: US 10,759,378 B2
(45) Date of Patent: Sep. 1, 2020

(54) PROTECTION DEVICE FOR PROTECTING ROAD USERS OUTSIDE A MOTOR VEHICLE, AND METHOD FOR OPERATING A PROTECTION DEVICE

(71) Applicant: Dr. Ing. h.c. F. Porsche Aktiengesellschaft, Stuttgart (DE)

(72) Inventor: Klaus Feeser, Vaihingen/Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/016,851

(22) Filed: Jun. 25, 2018

(65) Prior Publication Data
US 2019/0001920 A1    Jan. 3, 2019

(30) Foreign Application Priority Data

Jun. 30, 2017   (DE) .......................... 10 2017 114 652

(51) Int. Cl.
  *B60R 21/38*   (2011.01)
  *E05B 77/08*   (2014.01)
  *B60R 21/0136* (2006.01)

(52) U.S. Cl.
  CPC .......... *B60R 21/38* (2013.01); *B60R 21/0136* (2013.01); *E05B 77/08* (2013.01); *E05Y 2900/536* (2013.01)

(58) Field of Classification Search
  CPC ..... B60R 21/38; B60R 21/0136; F15B 15/19; E05Y 2900/536; E05B 77/08
  (Continued)

(56) References Cited

U.S. PATENT DOCUMENTS

| | | | |
|---|---|---|---|
| 7,661,496 B2 * | 2/2010 | Schafer | B60R 21/38 180/274 |
| 2009/0048734 A1 * | 2/2009 | Iwai | B60R 21/38 701/36 |

(Continued)

FOREIGN PATENT DOCUMENTS

| | | |
|---|---|---|
| DE | 10 2005 017 992 | 10/2006 |
| DE | 10 2005 038 474 | 2/2007 |

(Continued)

OTHER PUBLICATIONS

Machine Translation of EP-1153810-A2 (Year: 2001).*

(Continued)

*Primary Examiner* — Paul N Dickson
*Assistant Examiner* — Kurtis Nielson
(74) *Attorney, Agent, or Firm* — Gerald E. Hespos; Michael J. Porco; Matthew T. Hespos

(57) ABSTRACT

A protection device (1) has a sensor (3) to sense an impact of a road user outside a motor vehicle. A control device (4) is connected to the sensor (3) and evaluates signals sensed by the sensor (3). A rear actuator (6) is connected to the control device (4) and to a hinge arrangement (21) of a front hood (2) of the vehicle. The rear actuator (6) transfers a rear part of the front hood (2) into an impact position for damping an impact sensed by the sensor (3). A front actuator (7) is connected to the control device (4) and to a hood lock (20) in a front region of the front hood (2). The front actuator (7) transfers a front region of the front hood (2) into an impact position for damping the impact. The control device (4) activates the two actuators (6, 7) in a time-delayed manner.

8 Claims, 1 Drawing Sheet

(58) Field of Classification Search
USPC .......................................................... 180/274
See application file for complete search history.

(56) References Cited

U.S. PATENT DOCUMENTS

| | | | | |
|---|---|---|---|---|
| 2009/0152899 | A1* | 6/2009 | Scheuch | B60R 21/38 296/193.11 |
| 2010/0263957 | A1* | 10/2010 | Shaw | B60R 21/38 180/281 |
| 2011/0100743 | A1* | 5/2011 | Haunstetter | B60R 21/38 180/271 |
| 2015/0211265 | A1* | 7/2015 | Uyanik | E05B 85/045 292/195 |
| 2017/0282849 | A1* | 10/2017 | Aoyama | F15B 15/19 |
| 2020/0062202 | A1* | 2/2020 | Umezawa | B60R 21/0132 |

FOREIGN PATENT DOCUMENTS

| | | | | |
|---|---|---|---|---|
| DE | 102005038474 A1 * | 2/2007 | ............. | B60R 21/38 |
| DE | 10 2009 051 980 | 5/2011 | | |
| DE | 10 2013 105 826 | 12/2014 | | |
| EP | 1 153 810 | 11/2001 | | |
| EP | 1153810 A2 * | 11/2001 | ............. | B60R 21/38 |
| EP | 1527966 A1 * | 5/2005 | ............. | B60R 21/36 |
| EP | 1714837 A1 * | 10/2006 | ............. | B60R 21/38 |

OTHER PUBLICATIONS

Machine Translation of DE-102005038474-A1 (Year: 2005).*
Machine Translation of EP1714837 (Year: 2006).*
German Examination Report dated Nov. 20, 2017.
German Examination Report dated Mar. 2, 2020.

* cited by examiner

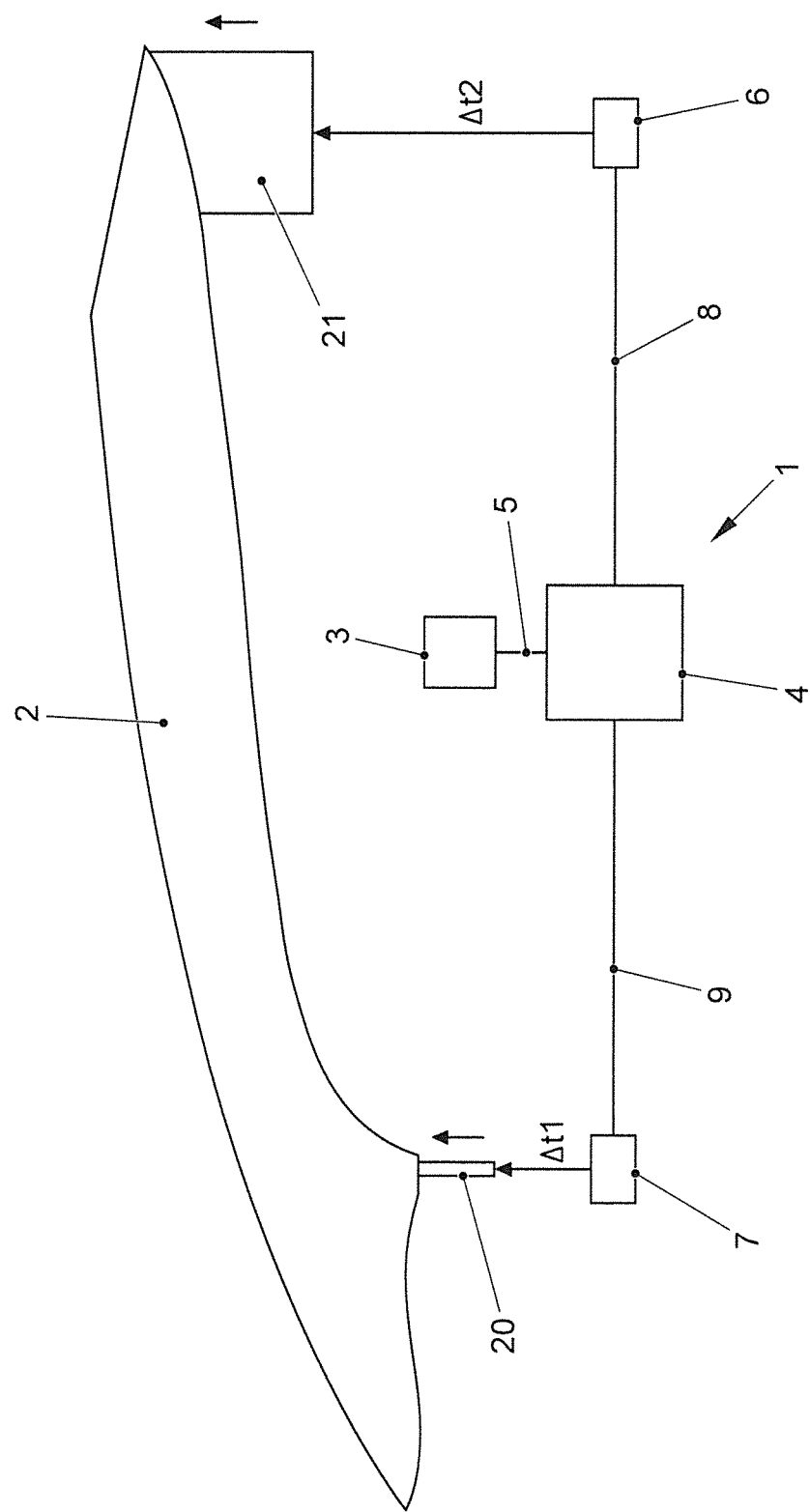

PROTECTION DEVICE FOR PROTECTING ROAD USERS OUTSIDE A MOTOR VEHICLE, AND METHOD FOR OPERATING A PROTECTION DEVICE

CROSS REFERENCE TO RELATED APPLICATION

This application claims priority under 35 USC 119 to German Patent Appl. No. 10 2017 114 652.0 filed on Jun. 30, 2017, the entire disclosure of which is incorporated herein by reference.

BACKGROUND

Field of the Invention

The invention relates to a protection device for protecting road users outside a motor vehicle, in particular pedestrians or (motor) cyclists. The invention also relates to a method for operating a protection device.

Description of Related Art

Motor vehicles should be designed to improve the safety of vehicle occupants and also to limit the consequences for road users, such as pedestrians and cyclists, upon an impact against the motor vehicle body. The front portion of the motor vehicle together with the front hood are particularly impact-critical regions. The front hood usually is designed to be relatively stiff due to its relatively large area. Furthermore, in its closed position, the front hood covers mechanically rather inflexible components of the motor vehicle, such as the engine, and therefore the deformation space of the front hood is restricted. As a result, this restricted deformation space constitutes a greater risk of injury than the front hood itself.

Active front hoods are used to reduce the risk of injury to pedestrians or (motor) cyclists upon an impact against the body of a motor vehicle. The concept of the active front hood is based on the finding that a pedestrian involved in a frontal collision with a motor vehicle initially strikes with his upper body against the front hood and, with a certain time delay, strikes his head. An active front hood has an active hinge arrangement that is activated by an actuator upon an impact of the road user and raises the front hood into an impact position. The impact position makes an enlarged deformation space available for the front hood. As a result, more energy can be absorbed and the risk of injury to the road user can be reduced significantly.

DE 10 2013 105 826 A1 discloses a protection device for protecting road users outside a motor vehicle, said protection device comprising a sensor that can sense an impact of a road user. Furthermore, a control device is provided and is designed to switch an actuator for damping into a flexible state depending on the time and/or the severity of the impact.

The invention has an object of providing an improved protection device for protecting road users outside a motor vehicle, and a method for operating a protection device of this type.

SUMMARY

The invention relates to a protection device that comprises a sensor to sense an impact of a road user, a control device connected to the sensor and designed to evaluate the signals sensed by the sensor, and a first actuator connected to the control device and operatively connected to a hinge arrangement of a front hood of the motor vehicle. The first actuator is designed to transfer the front hood on the hinge side into an impact position for damping the impact that has been sensed by the sensor. The protection device also comprises a second actuator that is connected to the control device and is activatable by the control device. The second actuator is connected operatively to a front hood lock in a front region of the front hood. The second actuator transfers a front region of the front hood into an impact position for damping the impact that has been sensed by the sensor. The control device is configured to activate the two actuators in a time-delayed manner with respect to each other. The additional actuator that acts on the front hood lock can transfer the front hood in this region into the impact position, in which the front hood is raised in relation to a closed position, and by means of the time-delayed activation of the two actuators. Thus, the protection of a road user in the event of an impact against the motor vehicle can be improved. The actuators for transferring the front hood into its impact position can be designed differently and can operate, for example, mechanically, magnetically or pneumatically. A pyrotechnic design of the actuators is preferred in some embodiments.

The control device may be configured for initially activating the second actuator, which is assigned to the front hood lock, and subsequently activating the first actuator, which is assigned to the hinge arrangement. It has been shown that, in the event of an impact of a road user, this measure has a positive effect upon the vibration behavior of the front hood when the latter is activated. A further advantage of initially activating the front actuator is that a pedestrian, for example, upon a frontal collision with the motor vehicle, first rolls with his upper body on a front region of the front hood and only after a certain time delay strikes with his head against a rear region of the front hood.

The control device may be configured to activate the front actuator within a first time interval $\Delta t1 < 10$ ms after the impact of the road user. As a result, activation of the front actuator occurs rapidly after the impact is sensed.

The control device may be configured to activate the rear actuator within a second time interval $\Delta t2$ after the activation of the front actuator, with the activation being in a range of between 35 ms and 45 ms. The second time interval $\Delta t2$ can be approximately 40 ms. It has been shown that this measure in combination with the length of the first time interval $\Delta t1$ (<10 ms) reduces the problem of what is referred to as the underswing or overswing of the hood after the triggering of the actuators. In this connection, the acceleration of the front hood can be reduced by at least 8 to 10 m/s² after a triggering that occurs in the event of an impact with a road user.

Rapid activation times of the actuators can be achieved by using a sensor that has a response time of <10 ms and preferably approximately 5 ms.

The invention also relates to a method for operating a protection device for protecting road users outside a motor vehicle, in particular pedestrians or (motor) cyclists. The protection device comprises at least one sensor designed to sense an impact of a road user, a control device connected to the sensor and designed to evaluate the signals sensed by the sensor, a rear actuator connected to the control device and to a hinge arrangement of a front hood of the motor vehicle, with the rear actuator being activatable by the control device to transfer the hinge side of the front hood into an impact position for damping the impact that has been sensed by the sensor, and a front actuator connected to a front hood lock in a front region of the front hood, with the front actuator transferring the front hood into an impact position for damping the impact that has been sensed by the sensor. The method includes actuating the two actuators in a time-delayed manner with respect to each other upon the impact of the road user. The time-delayed activation of the two actuators contributes to improving the protection of a road user in the event of an impact on the motor vehicle.

Vibration behavior of the front hood after activation can be improved by first actuating the actuator that is assigned to the front hood lock and subsequently actuating the actuator that is assigned to the hinge arrangement.

The method may include actuating the actuator that is assigned to the front hood lock within a first time interval $\Delta t1 < 10$ ms after the impact of the road user.

The method may include actuating the actuator that is assigned to the hinge arrangement within a second time interval $\Delta t2$ of between 35 ms and 45 ms after the activation of the actuator assigned to the front hood lock. This aspect of the method prevents what is referred to as underswing of the front hood.

Further features and advantages of the invention will become clear with reference to the description below of an embodiment with reference to the attached FIGURE.

BRIEF DESCRIPTION OF DRAWING

The FIGURE is a schematic illustration of a protection device for protecting road users outside a motor vehicle.

DETAILED DESCRIPTION

A protection device in accordance with the invention is identified by the numeral 1 in FIGURE and is provided for protecting road users outside a motor vehicle, in particular for protecting pedestrians or (motor) cyclists, in the event of a collision with the motor vehicle. In the event of a collision of this type, there is the risk that the road user will strike not only with his upper body, but also, in a time-delayed manner, with his head against a front hood 2 of the motor vehicle. A front region of the front hood 2 has a front hood lock 20 that enables the front hood 2 to be locked to a motor vehicle body or to be unlocked when the need arises. The front hood 2 also has a hinge arrangement 21 that enables the front hood 2 to be pivoted in a known manner from a closed position into an open position (and vice versa). The hinge arrangement 21 is designed kinematically so that, in the event of an impact of a road user, the front hood 2 can be raised from a starting position, which is defined by a first dead center position of the hinge arrangement 21, into an impact position, which is defined by a second dead center position of the hinge arrangement 21. Thus, the deformation space of the front hood 2 can be enlarged. Accordingly, more energy can be absorbed in the event of an impact of the road user, and, as a result, the risk of injury can be reduced.

The protection device 1 has at least one sensor 3 that is designed to sense a collision of a road user with the motor vehicle. Furthermore, the protection device 1 comprises a control device 4 connected to the sensor means 3 via a signal line 5.

The protection device 1 has a rear actuator 6 that interacts with the hinge arrangement 21 and a front actuator 7 that interacts with the front hood lock 20. The actuators 6, 7 cooperate to transfer the front hood 2 of the motor vehicle into its impact position, in which it is raised in relation to the closed position. The front hood lock 20 can be activated by means of the front actuator 7 to raise the front hood 2 in this region and to thereby transfer said front hood into an impact position. Unlike in the prior art, the front hood lock 20 therefore does not only function for locking or unlocking the front hood 2 on the body side. Like the hinge arrangement 21, the front hood lock 20 also can be activated by the front actuator 7 to raise the front hood 2 and to transfer the front hood 2 into its impact position, in which it has an enlarged deformation space.

The two actuators 6, 7 are connected to the control device 4 via signal lines 8, 9, and therefore the actuators 6, 7 can be activated by the control device 4 to activate the front hood 2 in the event of an impact of a road user. The actuators 6, 7 can differ in design and can operate, for example, mechanically, magnetically or pneumatically. A pyrotechnic design of the actuators 6, 7 is preferred.

The sensor 3 can be arranged on an outer surface of the vehicle body and can have a response time that is <10 ms and that preferably is approximately 5 ms. The effect achieved by this is that the two actuators 6, 7 can be activated by the control device 4 very rapidly after an impact of a road user is sensed.

A control algorithm for activating the two actuators 6, 7 in the event of an impact of a road user is implemented in the control device 4 and is explained in more detail below. If an impact of a road user is sensed with the aid of the sensor 3 and the corresponding sensor signals are evaluated by the control device 4, the two actuators 6, 7 are activated with a time delay with respect to each other by means of the control device 4. The front actuator 7 interacts with the front hood lock 20 and is activated first and within a first time interval $\Delta t1 < 10$ ms after the impact of the road user. The front actuator 7 causes the front hood 2 to be raised into its impact position in the region of the front hood lock 20. The rear actuator 6 is activated subsequently and within a second time interval $\Delta t2$ of approximately 40 ms after the activation of the front actuator 7. The rear actuator 6 transfers the hinge arrangement 21 from the first dead center position into the second dead center position and, in the process, raises the front hood 2 on the hinge side into its impact position.

It has been shown that the time-delayed activation of the two actuators 6, 7 has a positive effect on the vibration behavior of the front hood 2. Underswing of the front hood 2 can be restricted considerably in an advantageous manner by causing the front actuator 7 to activate the front hood lock 20 first, and only then causing the rear actuator 6 to activate the hinge arrangement 21 of the front hood 2. In particular, the acceleration of the front hood 2 after triggering in the event of an impact of a road user can be reduced by at least 8 to 10 m/s$^2$. This provides a further improvement in the protection of a road user in the event of an impact on the motor vehicle.

What is claimed is:

1. A protection device for protecting road users outside a motor vehicle, in particular pedestrians or cyclists, comprising:

sensor designed to sense an impact of a road user, a control device connected to the sensor and being operative to evaluate signals sensed by the sensor, a rear actuator operatively connected to the control device and activatable by the control device and further being operatively connected to a hinge arrangement of a front hood of the motor vehicle, the rear actuator being designed to transfer a hinge side of the front hood into an impact position for damping the impact of the road user that has been sensed by the sensor, and a front actuator operatively connected to the control device and activatable by the control device and further being operatively connected to a front hood lock in a front region of the front hood, wherein the front actuator is designed to transfer the front region of the front hood into an impact position for damping the impact of the road user that has been sensed by the sensor, wherein the control device is configured to activate the two actuators in a time-delayed manner with respect to each other by initially activating the front actuator, which is assigned to the front hood lock, and subsequently activating the rear actuator, which is assigned to the hinge arrangement.

2. The protection device of claim 1, wherein the control device is configured to activate the front actuator within a first time interval $\Delta t1<10$ ms after the impact of the road user.

3. The protection device of claim 2, wherein the control device is configured to activates the rear actuator within a second time interval $\Delta t2$ of between 35 ms and 45 ms after the activation of the front actuator.

4. The protection device of claim 3, wherein the second time interval $\Delta t2$ is approximately 40 ms.

5. The protection device of claim 1, wherein the sensor has a response time of <10 ms.

6. A method for operating a protection device for protecting road users outside a motor vehicle, the method comprising operating a sensor for sensing an impact of a road user, providing a control device that is connected operatively to the sensor and is configured to evaluate signals sensed by the sensor, sending a signal from the control device to a front actuator for causing a front hood lock in a front region of the front hood to transfer the front region of the front hood into an impact position for damping the impact that has been sensed by the sensor, sending a signal from the control device to a rear actuator for causing a hinge arrangement in a rear region of the front hood to transfer the rear region of the front hood into an impact position for damping the impact that has been sensed by the sensor, wherein the two actuators are activated in a time-delayed manner with respect to each other upon sensing the impact of the road user so that the front actuator is activated before the rear actuator.

7. The method of claim 6, wherein the front actuator is activated within a first time interval $\Delta t1<10$ ms after the impact of the road user has been sensing by the sensor.

8. The method of claim 7, wherein the rear actuator is activated within a second time interval $\Delta t2$ of between 35 ms and 45 ms after the activation of the front actuator.

* * * * *